US007293708B2

(12) United States Patent
Matsumoto et al.

(10) Patent No.: US 7,293,708 B2
(45) Date of Patent: Nov. 13, 2007

(54) MEMORY CARD CONNECTOR WITH PROTECTION AGAINST ERRONEOUS CARD INSERTION

(75) Inventors: Yasuyoshi Matsumoto, Yamato (JP); Mitsuhiro Tomita, Yamato (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/512,530

(22) PCT Filed: Apr. 30, 2003

(86) PCT No.: PCT/US03/13659

§ 371 (c)(1),
(2), (4) Date: May 26, 2005

(87) PCT Pub. No.: WO03/094095

PCT Pub. Date: Nov. 13, 2003

(65) Prior Publication Data

US 2005/0230474 A1 Oct. 20, 2005

(30) Foreign Application Priority Data

Apr. 30, 2002 (JP) ............................ 2002-127734

(51) Int. Cl.
*G06K 7/00* (2006.01)

(52) U.S. Cl. ...................................... 235/435; 235/486

(58) Field of Classification Search ................ 235/439, 235/486, 441; 439/159, 630
See application file for complete search history.

(56) References Cited

U.S. PATENT DOCUMENTS 6,394,827 B2 * 5/2002 Nogami ...................... 439/159
2006/0172572 A1 * 8/2006 Matsukawa et al. ........ 439/159

* cited by examiner

*Primary Examiner*—Michael G. Lee
*Assistant Examiner*—Jamara A. Franklin
(74) *Attorney, Agent, or Firm*—Charles S. Cohen

(57) ABSTRACT

A memory card connector includes a housing defining at least part of a card-receiving cavity of the connector and including a bottom wall and a side wall joined to the bottom wall. A slider is movably mounted on the housing and is engageable with the memory card for movement therewith. The slider is slidable along an inside of the side wall of the housing. The slider has a projection engageable in a recess in a side of the memory card. The projection causes the slider to be biased outwardly toward the side wall if the memory card is inserted into the cavity in an incorrect orientation. A slit is formed adjacent a juncture between the bottom wall and the side wall of the housing to allow the side wall to yield in the event that the slider is biased outwardly against the side wall in response to the incorrectly inserted memory card.

10 Claims, 8 Drawing Sheets

MEMORY CARD CONNECTOR WITH PROTECTION AGAINST ERRONEOUS CARD INSERTION

FIELD OF THE INVENTION

This invention generally relates to the art of electrical connectors and, particularly, to a memory card connector which has means for protecting the connector housing in the event of erroneous card insertion or forcible withdrawal of the card.

BACKGROUND OF THE INVENTION

Memory cards are known in the art and contain intelligence in the form of a memory circuit or other electronic program. Some form of card reader reads the information or memory stored on the card. Memory cards are used in many applications in today's electronic society, including video cameras, smartphones, music players, ATMs, cable television decoders, toys games, PC adapters and other electronic applications. A typical memory card includes a contact or terminal array for connection through an electrical connector to a card reader system and then to external equipment. The connector readily accommodates insertion and removal of the card to provide quick access to the information and program on the card. The card connector includes terminals for yieldably engaging the contact or terminal array of the card.

Some card connectors include a card ejection mechanism whereby the memory card is simply inserted into the connector, and the ejection mechanism is used to facilitate removal of the card from the connector. Some ejection mechanisms include sliders which engage the memory card for movement therewith into and out of the connector. Still further, some card connectors include mechanisms for preventing erroneous insertion of the card when the card is inserted in an upside-down orientation or reversed in a front-to-rear direction or for preventing forcible removal of the card even if the card is properly oriented. An example of this type of connector is shown in Japanese Patent Laid-Open No. 2001-118633 which discloses a card connector including a slider engageable with the card for movement therewith within a card-receiving cavity when the card is correctly inserted. However, if the card is inserted in a wrong orientation or the card is forcibly removed, the slider is forced into a slanting orientation against one side wall of the connector housing and the side wall may be deformed or even broken. The present invention is directed to solving these problems in such a card connector, by providing means to protect the connector housing in the event of an erroneous card insertion or in the event of forcible removal of the card.

SUMMARY OF THE INVENTION

An object, therefore, of the invention is to provide a new and improved memory card connector with improved means for protecting the card against erroneous card insertion or forcible card removal.

In the exemplary embodiment of the invention, the memory card connector includes a housing defining at least part of a card-receiving cavity of the connector and including a bottom wall and a side wall joined to the bottom wall. A slider is movably mounted on the housing and engageable with the memory card for movement therewith. The slider is slidable along an inside of the side wall of the housing. The slider has a projection engageable in a recess in a side of the memory card. The projection causes the slider to be biased outwardly toward the side wall if the memory card is inserted into the cavity in an incorrect orientation. A slit is formed adjacent a juncture between the top wall and the side wall of the housing to allow the side wall to yield in the event that the slider is biased outwardly against the side wall in response to an incorrectly inserted memory card.

According to one aspect of the invention, the side wall has a narrow section joined to the bottom wall and a wider section along the slit. An inside surface of the narrow section of the side wall is recessed to accommodate outward movement of the slider in the event that the slider is biased outwardly toward the side wall.

According to another aspect of the invention, the slider is movable between an outer limit position and an inner limit position. The slit is located near the inner limit position of the slider. The narrow section of the slider is near the outer limit position whereby the recessed area on the inside of the side wall is near the outer limit position of the slider to accommodate outward movement of the slider in the event that the slider is biased outwardly toward the side wall. Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
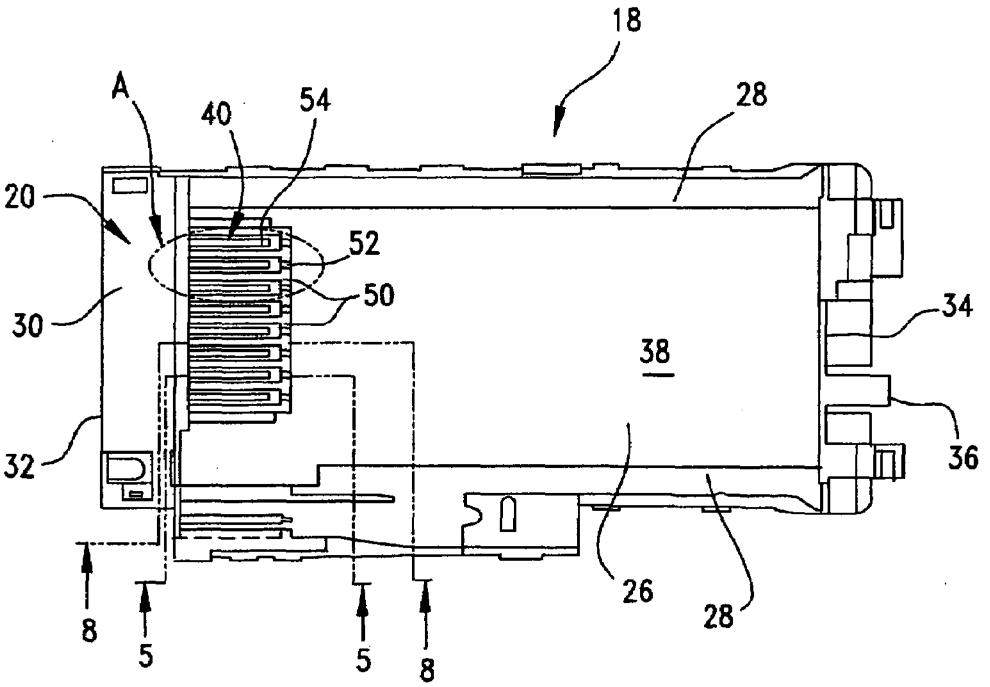
FIG. 1 is a top plan view of a memory card connector according to the invention.
Figure 2:
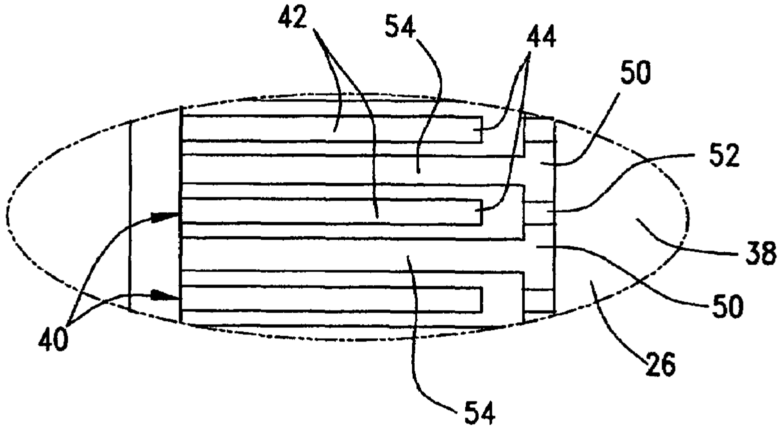
FIG. 2 is a fragmented perspective view of the memory card, with the metal shell removed to facilitate the illustration of the internal components of the connector.
Figure 3:
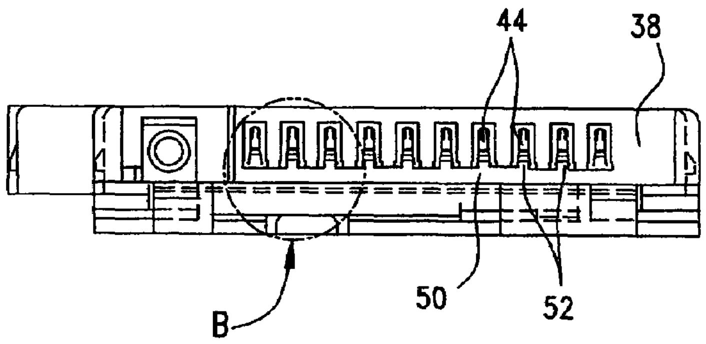
FIG. 3 is a side elevational view of the connector looking at the bottom side as viewed in FIG. 1.
Figure 4:
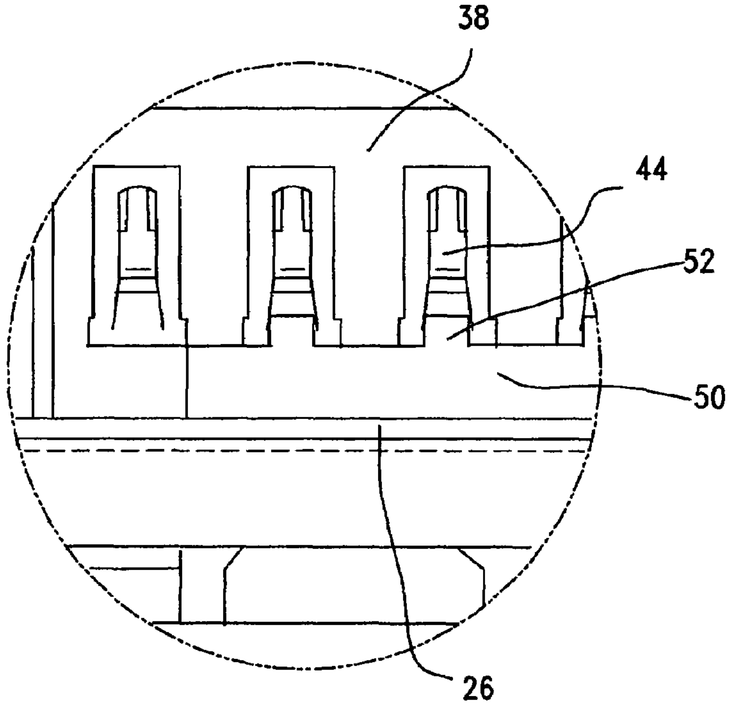
FIG. 4 is a side elevational view of the connector opposite that shown in FIG. 3.
Figure 5:
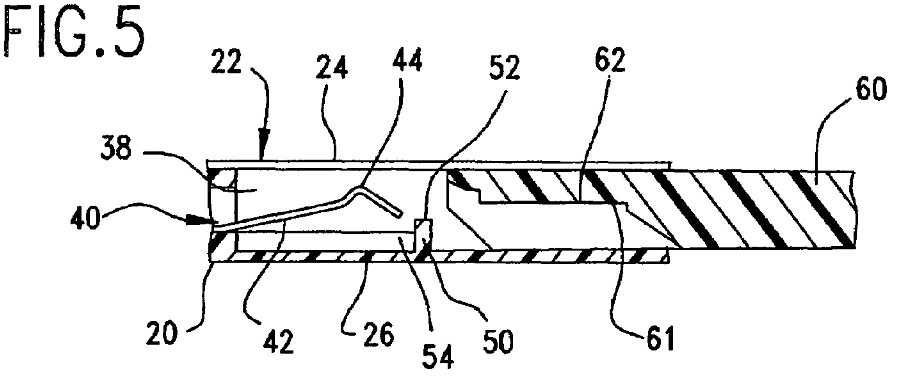
FIG. 5 is a front elevational view of the connector.
Figure 6:
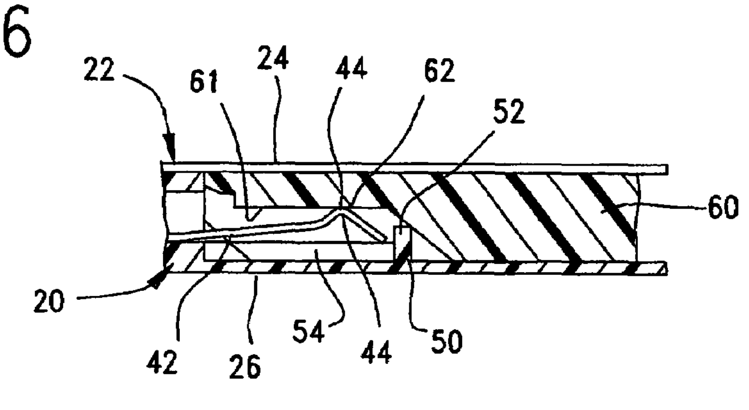
FIG. 6 is a rear elevational view of the connector.

Referring to the drawings in greater detail, and first to FIGS. 1-6, the invention is embodied in a memory card connector, generally designated 10, which includes a dielectric housing, generally designated 12, having a rear terminal-mounting portion 14 which mounts a plurality of terminals 16 having contact portions 16*a* for engaging contacts on the underside of a memory card 18 which is inserted into the housing in the direction of arrow 20 in FIG. 2. The housing is substantially covered by a metal shell, generally designated 22.

Housing 12 of connector 10 includes a bottom wall 24 and a pair of side walls, generally designated 26, which combine with a top wall 28 of metal shell 22 to define an interior card-receiving cavity 30 into which memory card 18 is inserted through an opening 32 at the front of the connector. A pivotally mounted shutter 34 is provided for opening and closing opening 32. Metal shell 22 includes a pair of side walls 36 overlying side walls 26 of housing 12.

Dielectric housing 12 may be molded of plastic material or the like, with side walls 26 being integral with bottom wall 24. As seen best in FIG. 2, one side wall 26 is enlarged, as at 26*a* and includes an outwardly offset portion 26*b* defining a side cavity 38 within which a slider, generally designated 40, is reciprocally movable. A coil spring 42 is sandwiched between the slider and the terminal-mounting portion 14 of the housing to bias the slider outwardly opposite the insertion direction of the memory card. The slider has an inner arcuate surface 44 for engaging an arcuate corner 46 (FIG. 2) of memory card 18. FIG. 2 clearly shows that the slider also includes an inwardly directed projection 48 which interengages with the memory card as will be described hereinafter.

Figure 7:
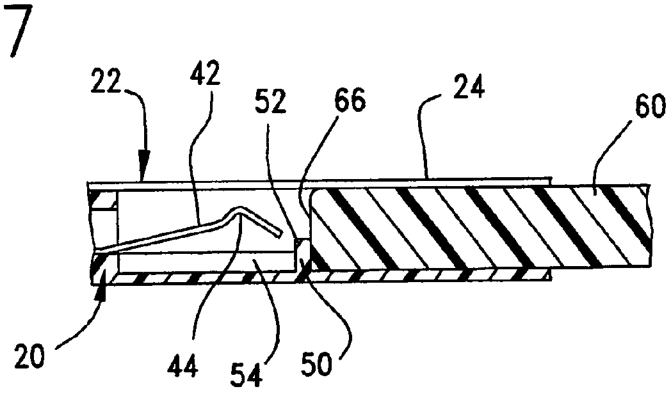
FIG. 7 is a top plan view of the connector on a reduced scale, with the metal shell removed and with the memory card normally inserted into the connector.
Figure 8:
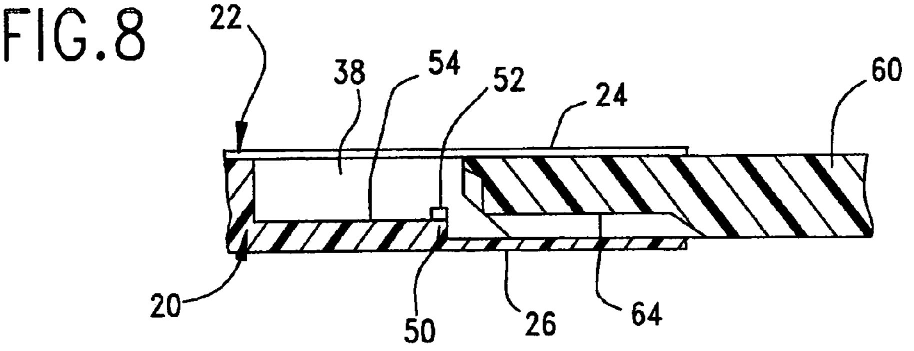
FIGS. 8-10 show the normal interengagement of the memory card with the slider and show sequential views of the memory card and slider moving together to the fully inserted position of the card.
Figure 9:
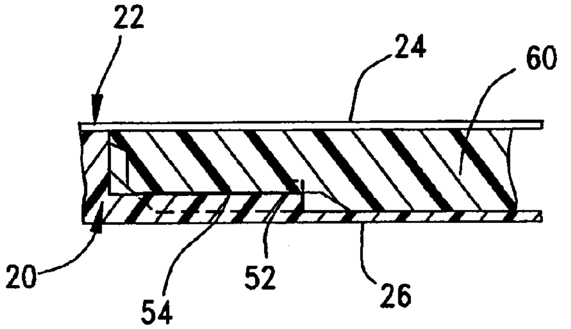

Slider 40 is part of what is called a "push/push type ejector mechanismt" which includes coil spring 42 for biasing memory card 18 in a direction of removal of the card from the connector (i.e., opposite arrow 20 in FIG. 2). The ejector mechanism includes a heart cam groove 50 formed in an upper surface of the slider and a cam pin 52 for engagement with the heart cam groove. When a person pushes on the memory card to its fully inserted position in card-receiving cavity 30 and releases the card, slider 40 moves slightly back under the biasing force of coil spring 42 and is stopped by the cam groove. When the card is again or sequentially pushed in the card insertion direction, slider 40 is moved back under the influence of spring 42 against enlarged side wall portion 26*a* of this side wall 26 which acts as a stop defining an outer limit position of the slider, thereby ejecting the memory card. Cam pin 52 is formed by a leg on one end of a rod member 54 which has an opposite end 56 inserted into a hole 58 (FIGS. 8 and 10) in enlarged side wall portion 26*a*. Cam pin 52 projects downwardly from top wall 28 of the metal shell to engage in heart cam groove 50. As seen in FIG. 1, a leaf spring 60 is cut out of the top wall of the metal shell to bias cam pin 52 into the heart cam groove. A leaf spring 62 similarly is stamped out of a side plate portion 64 of the metal shell for abutting against the outside of the slider. Referring to FIGS. 7 and 9, projection 48 (FIG. 8) projects inwardly from an inner side surface 66 of slider 40 before the inner side surface turns into inner arcuate surface 44. When memory card 18 is properly oriented and inserted into the connector in the direction of arrow 20, projection 48 snaps into a recess 68 in a side edge of the memory card. This latches the card to slider 40 when the memory card is inserted such that arcuate corner 46 of the card engages inner arcuate surface 44 of the slider. It can be seen that outwardly offset side wall portion 26*b* of this side wall 26 has a forward narrowed section 26*c* defining a recessed area 70 on the inside thereof. This recessed area defines a space 72 between the side wall portion 26*b* and an outer side 74 of slider 40. Therefore, when memory card 18 is inserted into engagement with projection 48, slider 40 can skew outwardly into space 72 against the biasing of leaf spring 62 (FIGS. 1 and 2) of the metal shell until projection 48 "snaps" into recess 68.

It should be understood that FIGS. 8-11 are enlargements of an area indicated by a block "X" in FIG. 7. With that understanding, it can be seen in FIG. 8 that a slit 80 is formed in bottom wall 24 of the housing at a juncture between the bottom wall and the outwardly offset portion 26*b* of side wall 26. This slit is at an inner end of the "stroke" of movement of slider 40 between terminal-mounting portion 14 of the housing and enlarged side wall portion 26*a*.

Figure 10:
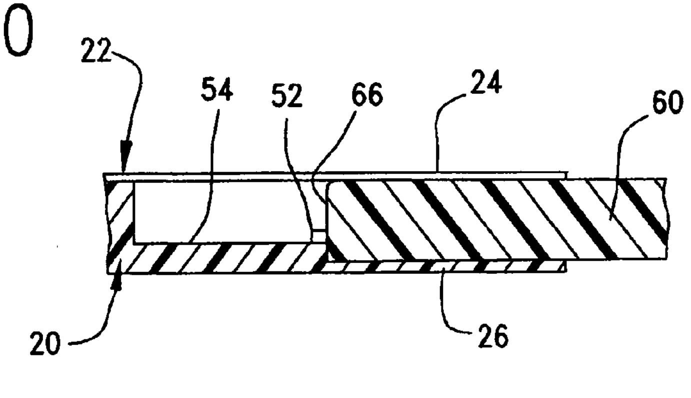
Figure 11:
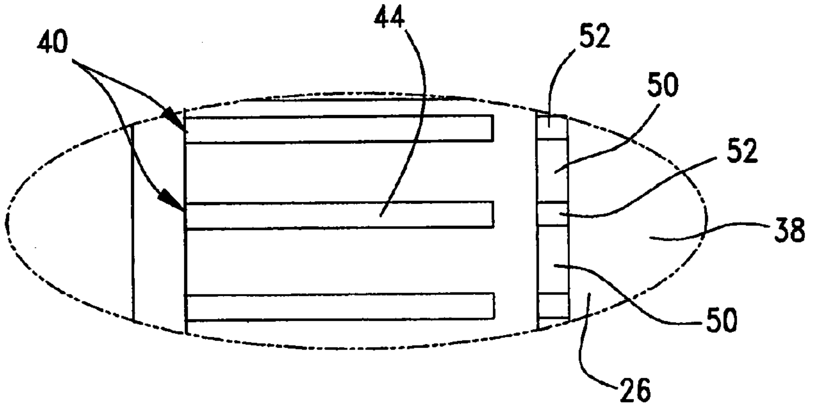
FIG. 11 is a view similar to that of FIG. 10, with the memory card shown as being forcibly pulled or removed from the connector.
Figure 12:
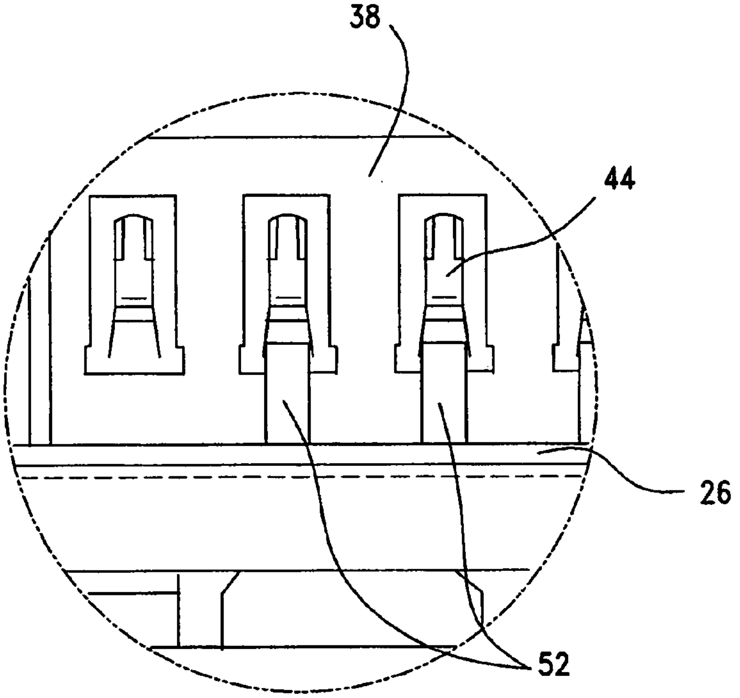
FIG. 12 is an isolated view of an area encircled at "A" in FIG. 11 to show the slit in the bottom wall of the housing adjacent the side wall thereof.
Figure 13:
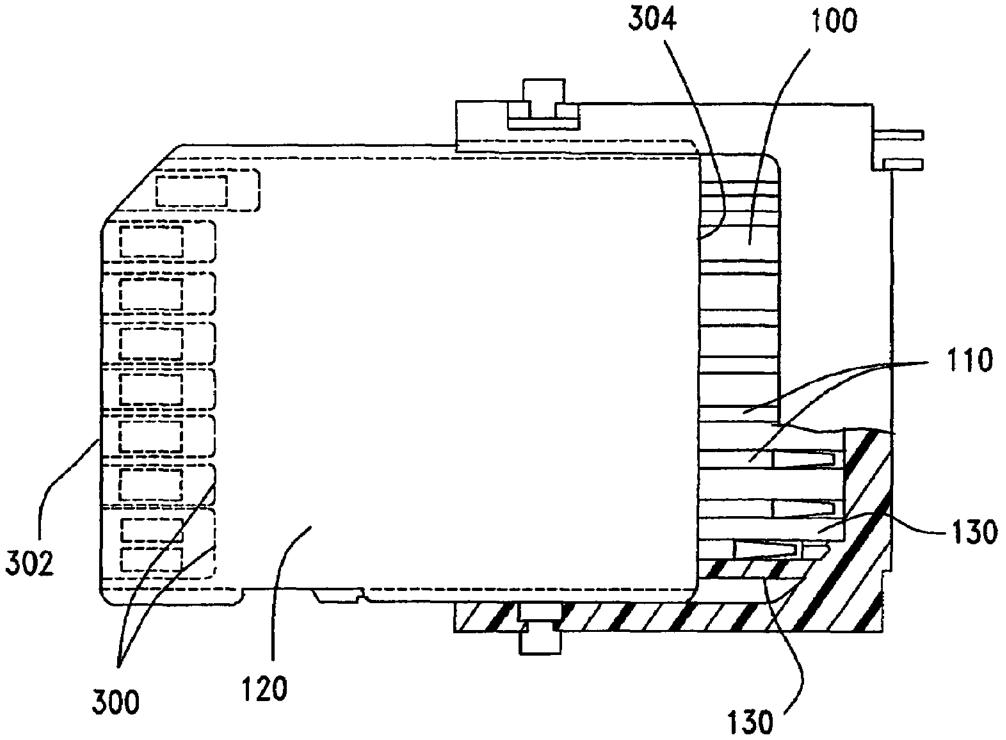
FIG.13 (PRIOR ART)
FIG. 13 is a view similar to that of FIG. 11, with the memory card being further pulled out of the connector.
Figure 14:
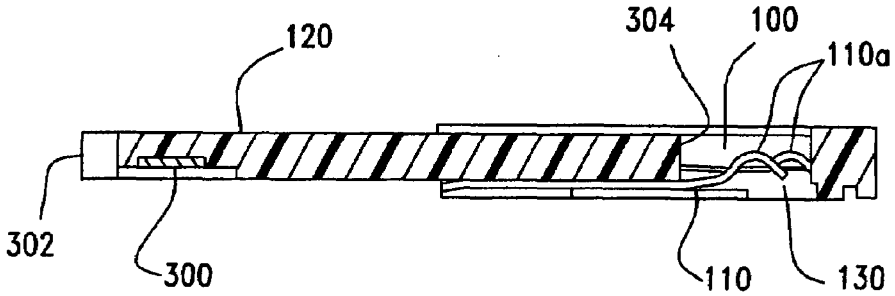
FIG.14 (PRIOR ART)
FIG. 14 is an isolated view of the housing in the area encircled at "B" in FIG. 13.
Figure 15:
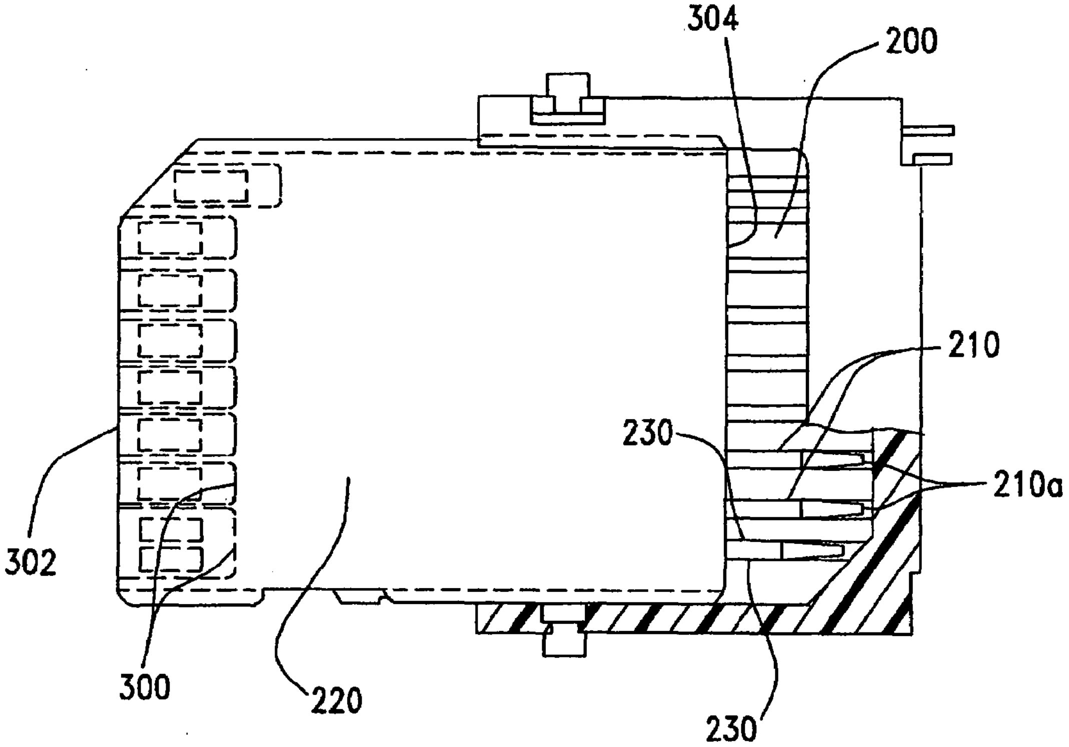
FIG.15 (PRIOR ART)
FIG. 15 is a top plan view of the connector showing the memory card being inserted thereinto in an erroneous orientation.

FIGS. 9 and 10 show memory card 18 and slider 40 moving conjointly further to the fully inserted position of the memory card as shown in FIG. 10. In essence, enlarged side wall portion 26*a* forms an outer limit position of the slider and the memory card as seen in FIG. 8, and terminal-mounting portion 14 of the housing defines an inner limit position of movement of the slider and the memory card as seen in FIG. 10.

FIGS. 11-14 show a situation where memory card 18 is being forcibly removed from the connector in the direction of arrow 82. In other words, a person is not relying on the "push/push" ejector mechanism. When this happens, projection 48 on the slider rides out of recess 68 while the slider is in its full inner limit position. Because of slit 80 between the bottom wall and the side wall of the housing, side wall portion 26*b* can yield outwardly in the direction of arrow 84 without the side wall breaking.

Figure 16:
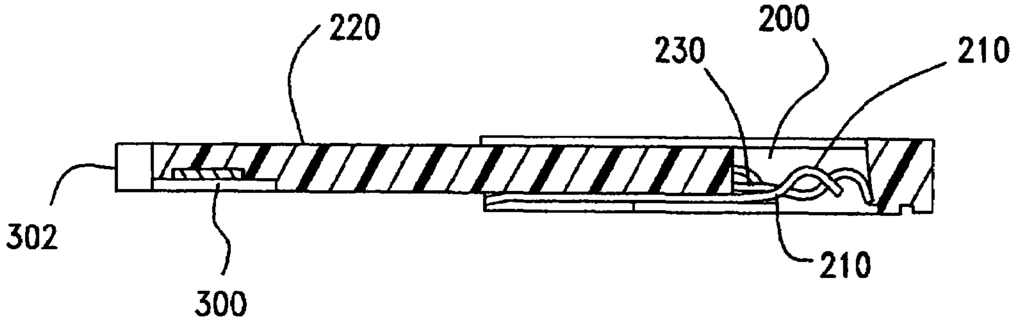
FIG.16 (PRIOR ART)
FIGS. 16, 17 and 19 are sequential views of the movement of the memory card and slider as the erroneously oriented memory card is pushed into the connector.
Figure 16:
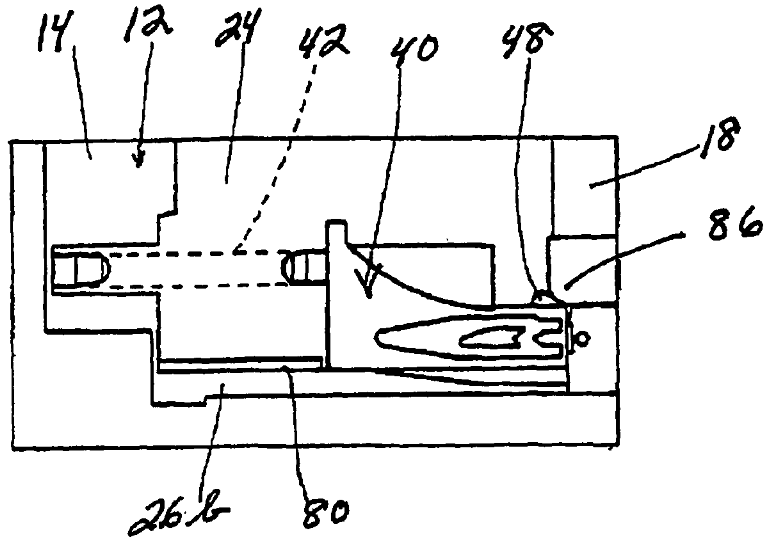
Figure 17:
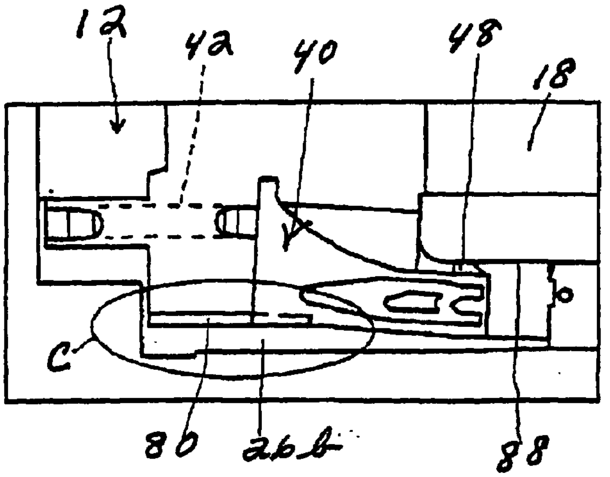
Figure 18:
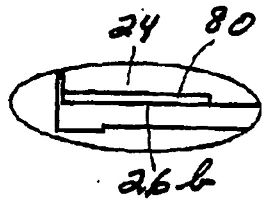
FIG. 18 is an isolated view of the housing in the area encircled at "C" in FIG. 17.
Figure 19:
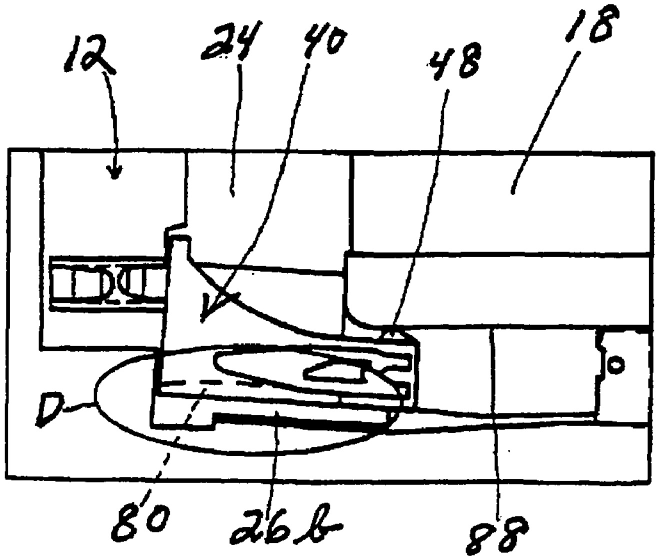
Figure 20:
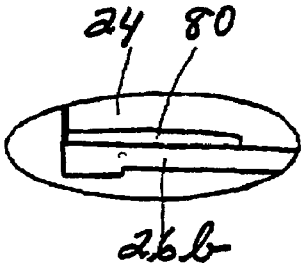
FIG. 20 is an isolated view of the housing in the area encircled at "D" in FIG. 19.

FIGS. 15-20 show a situation wherein memory card 18 is being inserted into the connector in an erroneous orientation. As shown, the normal rear end of the memory card is inserted instead of the front end of the card. In other words, the card is inserted in a reversed front-to-rear orientation. The same situation would occur if the memory card is inserted in an erroneous upside-down orientation. In either erroneous orientation, recess 68 in the side edge of the memory card will not be in a position for accepting projection 48 of slider 40. Again, FIGS. 16, 17 and 19 are enlargements of an area indicated by the block "Y" in FIG. 15.

With those understandings, FIG. 16 shows a blunt corner 86 of memory card 18 engaging projection 48 of slider 40. FIG. 17 shows the memory card inserted further until projection 48 engages a side edge 88 of the memory card. Since blunt corner 86 of the card is not rounded and since side edge 88 of the card is void of recess 68, further insertion movement of the erroneously oriented memory card will cause slider 40 to move all the way to its inner limit position shown in FIG. 19. Normally, in prior art connectors, this could cause the side walls of the housing to deform or even break. However, with side wall portion 26*b* joining bottom wall 24 at slit 80, the slit allows the side wall portion to yield outwardly instead of breaking.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

The invention claimed is:

1. A memory card connector, comprising: a housing defining at least part of a card-receiving cavity of the connector and including a bottom wall and a side wall joined to the bottom wall; a slider movably mounted on the housing and engageable with a memory card for movement therewith, the slider being slidable along an inside of said side wall of the housing, the slider having a projection engageable in a recess in a side of the memory card, the projection causing the slider to be biased outwardly toward the side wall if the memory card is inserted into the cavity in an incorrect orientation; and a slit formed adjacent a juncture between the bottom wall and the side wall of the housing to allow the side wall to yield in the event that the slider is biased outwardly against the side wall in response to an incorrectly inserted memory card, wherein said side wall has a narrow section joined to said bottom wall and a wider section along said slit.

2. The memory card connector of claim 1 wherein said slider is movable between an outer limit position and an inner limit position, said slit being located near the inner limit position of the slider.

3. The memory card connector of claim 2 wherein said side wall is narrowed to define an inside recessed area near the outer limit position of the slider to accommodate outward movement of the slider in the event that the slider is biased outwardly toward the side wall.

4. The memory card connector of claim 1 wherein an inside space of said narrow section of the side wall is recessed on the inside thereof to accommodate outward movement of the slider in the event that the slider is biased outwardly toward the side wall.

5. The memory card connector of claim 1 wherein said slide is movable between an outer limit position and an inner limit position, and said side wall is recessed on the inside thereof near the outer limit position of the slider to accommodate outwardly movement of the slider in the event that the slider is biased outwardly toward the side wall.

6. A memory card connector, comprising: a housing defining at least part of a card-receiving cavity of the connector and including a bottom wall and a side wall joined to the bottom wall; a slider movably mounted on the housing and engageable with a memory card for movement therewith, the slider being slidable along an inside of said side wall of the housing, the slider having a projection engageable in a recess in a side of the memory card, the projection causing the slider to be biased outwardly toward the side wall if the memory card is inserted into the cavity in an incorrect orientation; and a slit formed adjacent a juncture between the bottom wall and the side wall of the housing to allow the side wall to yield in the event that the slider is biased outwardly against the side wall in response to an incorrectly inserted memory card, wherein said side wall has a narrow section joined to said bottom wall and a wider section along said slit; and wherein an inside surface of said narrow section of the side wall is to accommodate outward movement of the slider in the event that the slider is biased outwardly toward the side wall.

7. A memory card connector, comprising: a housing defining at least part of a card-receiving cavity of the connector and including a bottom wall and a side wall joined to the bottom wall; a slider movably mounted on the housing and engageable with a memory card for movement therewith, the slider being slidable along an inside of said side wall of the housing, the slider having a projection engageable in a recess in a side of the memory card, the projection causing the slider to be biased outwardly toward the side wall if the memory card is inserted into the cavity in an incorrect orientation; and a slit formed adjacent a juncture between the bottom wall and the side wall of the housing to allow the side wall to yield in the event that the slider is biased outwardly against the side wall in response to an incorrectly inserted memory card, wherein said side wall has a narrow section joined to said bottom wall and a wider section along said slit; wherein said slider is movable between an outer limit position and an inner limit position, said slit being located near the inner limit position of the slider; and wherein said side wall is narrowed to define an inside recessed area near the outer limit position of the slider to accommodate outward movement of the slider in the event that the slider is biased outwardly toward the side wall.

8. A memory card connector, comprising: a housing defining at least part of a card-receiving cavity of the connector and including a bottom wall and a side wall joined to the bottom wall; a slider movably mounted on the housing and engageable with a memory card for movement therewith, the slider being slidable along an inside of said side wall of the housing, the slider having a projection engageable in a recess in a side of the memory card, the projection causing the slider to be biased outwardly toward the side wall if the memory card is inserted into the cavity in an incorrect orientation; and a slit formed adjacent a juncture between the bottom wall and the side wall of the housing to allow the side wall to yield in the event that the slider is biased outwardly against the side wall in response to an incorrectly inserted memory card, wherein said side wall has a narrow section joined to said bottom wall and a wider section along said slit; and wherein said slide is movable between an outer limit position and an inner limit position, and said side wall is recessed on the inside thereof near the outer limit position of the slider to accommodate outward movement of the slider in the event that the slider is biased outwardly toward the side wall.

9. A memory card connector, comprising a housing defining at least part of a card-receiving cavity of the connector and including a bottom wall and a side wall joined to the bottom wall; a slider movably mounted on the housing and engageable with the memory card for movement therewith, the slider being slidable along an inside of said side wall of the housing between an outer limit position and an inner limit position, the slider having a projection engageable in a recess in a side of the memory card, the projection causing the slider to be biased outwardly toward the side wall if the memory card is inserted into the cavity in an incorrect orientation; said side wall being recessed on the inside thereof near the outer limit position of the slider to accommodate outward movement of the slider in the event that the slider is biased outwardly toward the side walls; and a slit formed adjacent a juncture between the bottom wall and the side wall of the housing, the slit being located near the inner limit position of the slider to allow the side wall to yield in the event that the slider is biased outwardly against the side wall in response to an incorrectly inserted memory card.

10. The memory card connector of claim 9 wherein said side wall has a narrow section joined to said bottom wall and recessed on the inside thereof near the outer limit position of the slider and a wider section along said slit near the inner limit position of the slider.

* * * * *